US009630574B2

(12) United States Patent
Koda et al.

(10) Patent No.: US 9,630,574 B2
(45) Date of Patent: Apr. 25, 2017

(54) EXTERIOR COMPONENT FOR A VEHICLE

(71) Applicant: AISIN SEIKI KABUSHIKI KAISHA, Kariya-shi (JP)

(72) Inventors: Satoshi Koda, Kariya (JP); Kazuhiro Sawada, Nagoya (JP)

(73) Assignee: AISIN SEIKI KABUSHIKI KAISHA, Kariya-shi (JP)

( * ) Notice: Subject to any disclaimer, the term of this patent is extended or adjusted under 35 U.S.C. 154(b) by 0 days.

(21) Appl. No.: 15/070,552

(22) Filed: Mar. 15, 2016

(65) Prior Publication Data

US 2016/0280154 A1 Sep. 29, 2016

(30) Foreign Application Priority Data

Mar. 26, 2015 (JP) ................................. 2015-065165

(51) Int. Cl.
*B60J 9/00* (2006.01)
*B60R 13/06* (2006.01)
*B60R 13/00* (2006.01)

(52) U.S. Cl.
CPC ............ *B60R 13/06* (2013.01); *B60R 13/005* (2013.01)

(58) Field of Classification Search
CPC ........ A47B 96/021; B65D 2543/00629; B65D 2543/00685; B65D 2543/00796; B65H 2701/31; B01D 17/0202; B01D 29/012; F16K 5/201; F23R 3/60; A01K 97/01
USPC ...................................................... 296/1.08
See application file for complete search history.

(56) References Cited

U.S. PATENT DOCUMENTS

| 9,067,556 | B2 * | 6/2015 | Bosch | ................... B60R 21/203 |
| 9,358,935 | B2 * | 6/2016 | Shen | ....................... B60R 13/04 |
| 2009/0174204 | A1 * | 7/2009 | Robertson | ........... B60R 13/0256 |
| | | | | 296/1.08 |
| 2009/0243460 | A1 * | 10/2009 | Umezawa | ........... B29C 45/0062 |
| | | | | 313/110 |

(Continued)

FOREIGN PATENT DOCUMENTS

| DE | 10 2013 001 321 A1 | 7/2014 |
| JP | 2009-282068 | 12/2009 |
| JP | 2010-108829 | 5/2010 |

OTHER PUBLICATIONS

Extended European Search Report issued Aug. 19, 2016 in Patent Application No. 16159184.7.

*Primary Examiner* — Kiran B Patel
(74) *Attorney, Agent, or Firm* — Oblon, McClelland, Maier & Neustadt, L.L.P.

(57) ABSTRACT

An exterior component for a vehicle includes: a first member having a design surface disposed on a vehicle surface; and a second member forming a housing space sealed between the first and second members in a liquid tight manner by being joined to the first member on a rear side of the design surface, wherein a joint portion between the first member and the second member is configured of an annular recessed portion provided on one side of the first and second members, an annular protrusion portion provided on the other side of the first and second members, and elastic adhesive with which an inside of the annular recessed portion is filled thereby fixing the annular protrusion portion inserted into the inside of the annular recessed portion over the entire peripheries of the annular protrusion and annular recessed portions.

9 Claims, 3 Drawing Sheets

(56) References Cited

U.S. PATENT DOCUMENTS

| | | | |
|---|---|---|---|
| 2010/0171333 A1* | 7/2010 | Smith | B29C 43/18 |
| | | | 296/1.08 |
| 2012/0068488 A1* | 3/2012 | Mourou | B60R 13/0206 |
| | | | 296/1.08 |
| 2012/0256543 A1* | 10/2012 | Marcove | B60Q 1/2607 |
| | | | 315/77 |
| 2013/0107046 A1* | 5/2013 | Forgue | B60R 11/04 |
| | | | 348/148 |
| 2013/0196089 A1 | 8/2013 | Ostrander et al. | |
| 2015/0241015 A1* | 8/2015 | Johnson | G09F 19/18 |
| | | | 362/509 |
| 2015/0241016 A1* | 8/2015 | Sura | B60Q 1/56 |
| | | | 362/509 |
| 2016/0211094 A1* | 7/2016 | Fuchs | H01H 3/161 |
| 2016/0343522 A1* | 11/2016 | Kang | H01H 9/285 |

* cited by examiner

EXTERIOR COMPONENT FOR A VEHICLE

CROSS REFERENCE TO RELATED APPLICATIONS

This application is based on and claims priority under 35 U.S.C. §119 to Japanese Patent Application 2015-065165, filed on Mar. 26, 2015, the entire contents of which are incorporated herein by reference.

TECHNICAL FIELD

This disclosure relates to an exterior component for a vehicle.

BACKGROUND DISCUSSION

In the related art, as a waterproof structure to seal a joint portion between two members in a liquid tight manner, a method of using an O-ring made of an elastic material such as rubber is generally used (for example, see JP2009-282068A (Reference 1)). That is, it is possible to fill a gap of the joint portion by squeezing the O-ring by using a fastening force between the two members. Thus, it is possible to secure waterproofness.

However, if such a waterproof structure is applied to, for example, an exterior component of a vehicle such as an emblem part, squeeze unevenness of the O-ring becomes a problem. That is, a squeeze amount of the O-ring is reduced in a position separated from a fastening portion by a bolt, a screw, and the like. Then, in a case of the exterior component disposed on a vehicle surface, penetration of water may be allowed from a portion in which the squeeze amount of the O-ring is small by a water pressure at the time of high-pressure washing. Thus, in this respect, there is still room for improvement.

SUMMARY

Thus, a need exists for an exterior component for a vehicle which is not suspectable to the drawback mentioned above.

An aspect of this disclosure is directed to an exterior component for a vehicle preferably including a first member that has a design surface disposed on a vehicle surface; and a second member that forms a housing space which is sealed between the first member and the second member in a liquid tight manner by being joined to the first member on a rear side of the design surface, in which a joint portion between the first member and the second member is configured of an annular recessed portion that is provided on one side of the first member and the second member, an annular protrusion portion that is provided on the other side of the first member and the second member, and elastic adhesive with which an inside of the annular recessed portion is filled thereby fixing the annular protrusion portion inserted into the inside of the annular recessed portion over the entire peripheries of the annular protrusion portion and the annular recessed portion.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Figure 1:
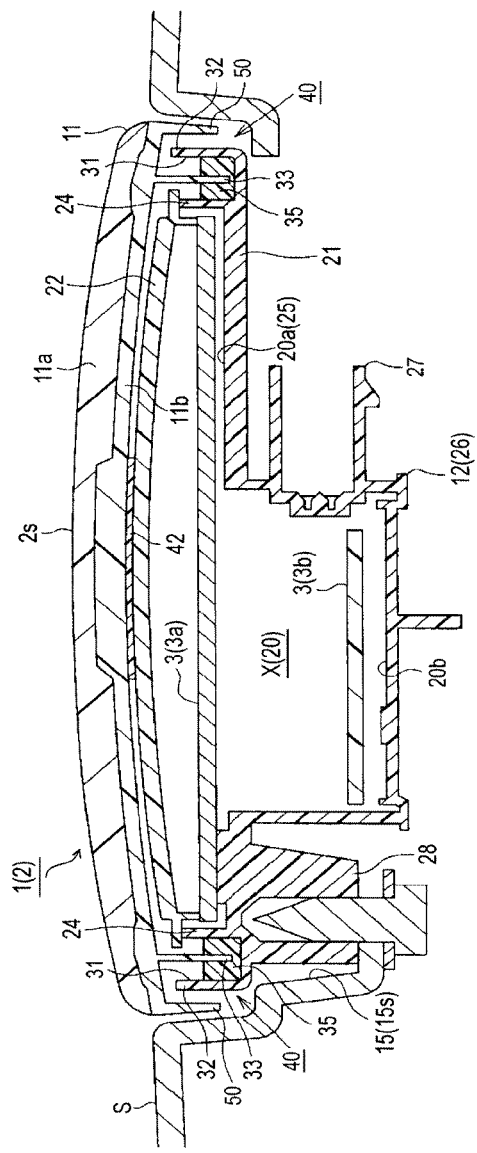
FIG. 1 is a sectional view of an emblem switch.

Hereinafter, an embodiment that is embodied in an emblem switch for a vehicle will be described with reference to the drawings. As illustrated in FIG. 1, an emblem switch 1 provided on a vehicle surface S includes an emblem part 2 as an exterior component for a vehicle and an electrostatic capacitive sensor 3 that is housed on an inside of the emblem part 2. That is, in the emblem switch 1 of the embodiment, the electrostatic capacitive sensor 3 built in the emblem part 2 detects an object adjacent to a design surface 2s of the emblem part 2. Thus, a configuration, which functions as a non-contact type sensor switch capable of applying to a door opening and closing device which is able to automatically open and close a vehicle door, a door lock device which is able to perform lock and unlock operations of the vehicle door, and the like by detecting an operation input of a user, is provided.

Figure 2:
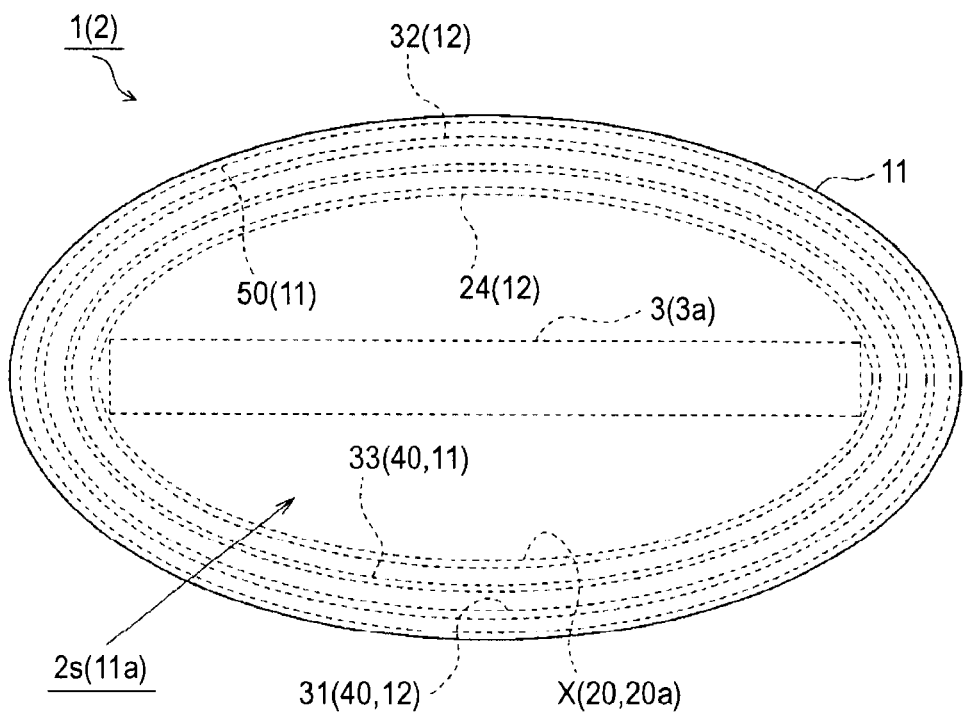
FIG. 2 is a plan view of the emblem switch.

In addition, as illustrated in FIG. 2, the emblem part 2 of the embodiment has the substantially elliptical-shaped design surface 2s. Then, an emblem mark (not illustrated) is three-dimensionally formed in the design surface 2s.

As illustrated in FIG. 1, in the emblem switch 1 of the embodiment, the emblem part 2 includes a first member (first case member) 11 having the design surface 2s and a second member (second case member) 12 forming a housing space X that is sealed between the first member 11 and the second member 12 in a liquid tight manner by causing the second member 12 to be joined to a rear side of the first member 11. Then, the emblem part 2 is configured to be installed to an installation recessed portion (hole portion) 15 formed on the vehicle surface S in a state (substantially flush) where the design surface 2s slightly protrudes from the vehicle surface S.

In detail, in the emblem switch 1 of the embodiment, both the first member 11 and the second member 12 configuring the emblem part 2 are formed by using resin. The first member 11 of the embodiment has a two-layered structure formed of a surface portion 11a configuring the design surface 2s thereof and a rear surface portion 11b joined to the second member 12. In addition, the second member 12 of the embodiment has a body portion 21 having a housing recessed portion 20 and an inner cover member 22 fixed to an opening end of the housing recessed portion 20. In addition, in the embodiment, the inner cover member 22 is fixed to the opening end of the housing recessed portion 20 by adhering, welding, or the like after assembling a housed body within the housing recessed portion 20. Then, the emblem switch 1 of the embodiment is configured to hold a sensor electrode 3a and a circuit substrate 3b configuring the electrostatic capacitive sensor 3 on the inside of the housing recessed portion 20 formed in the housing space X.

Specifically, in the second member 12 of the embodiment, the housing recessed portion 20 of the body portion 21 is configured to include a first recessed portion 20a having a side wall portion 24 that forms the opening end of the housing recessed portion 20 and a second recessed portion 20b provided in a bottom surface 25 of the first recessed portion 20a to be recessed. Then, the second member 12 of the embodiment is configured to hold the sensor electrode 3a of the electrostatic capacitive sensor 3 on an inside of the first recessed portion 20a and to hold the circuit substrate 3b of the electrostatic capacitive sensor 3 on an inside of the second recessed portion 20b.

In addition, in the second member 12 of the embodiment, a forming portion of the second recessed portion 20b has a shape to protrude substantially in a box shape when viewing the body portion 21 of the second member 12 from a rear side (rear side of the design surface 2s and a lower side in FIG. 1). Furthermore, a connector portion 27 of the electrostatic capacitive sensor 3 housed on the inside of the emblem part 2 is formed in a box-shaped portion 26. Then, the second member 12 of the embodiment has a screw stop portion 28 on a side portion of the connector portion 27.

That is, the emblem switch 1 of the embodiment is fixed to the inside of the installation recessed portion 15 using the screw stop portion 28 formed in the second member 12. Thus, the second member 12 is disposed on the inside of the installation recessed portion 15 and then the surface portion 11a of the first member 11 configuring the design surface 2s is configured to be disposed in a position in which the surface portion 11a slightly protrudes from the vehicle surface S.

Figure 3:
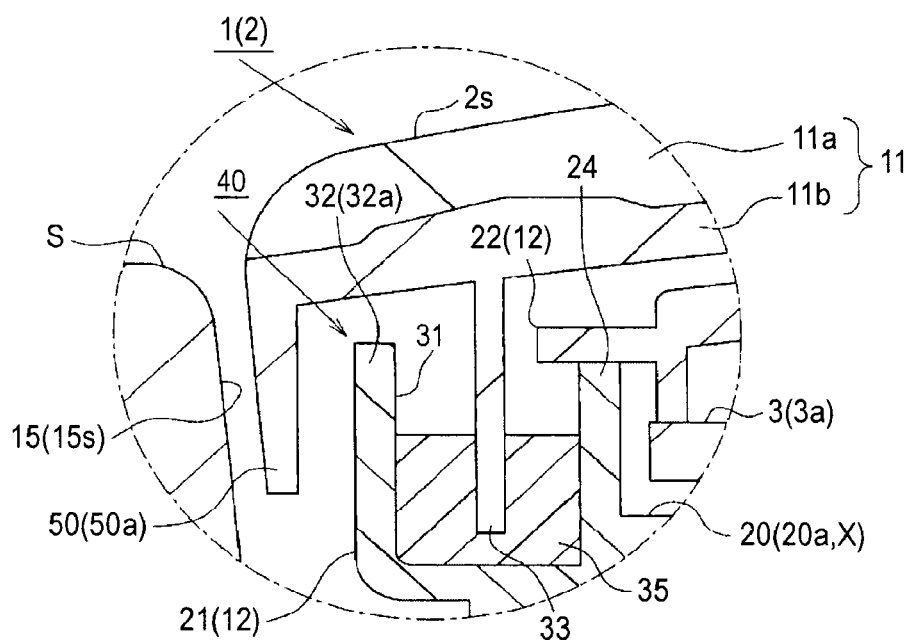
FIG. 3 is an enlarged sectional view of the vicinity of a joint portion between a first member and a second member configuring an emblem part.

As illustrated in FIGS. 1 to 3, the second member 12 of the embodiment has an annular recessed portion 31 extending over the entire periphery of the second member 12 on an outside of the housing recessed portion 20. In the embodiment, the annular recessed portion 31 is formed on an outside of the side wall portion 24 forming the opening end of the housing recessed portion 20 by extending an outer wall portion 32 along the side wall portion 24. In addition, the first member 11 of the embodiment has an annular protrusion portion 33 that is extended over the entire periphery of the first member 11 along an outer edge of the rear surface portion 11b. Then, the emblem part 2 of the embodiment has a configuration in which the first member 11 and the second member 12 are assembled in a mode in which the annular protrusion portion 33 on the first member 11 side is inserted between the side wall portion 24 and the outer wall portion 32 of the housing recessed portion 20 configuring the annular recessed portion 31 on the second member 12 side.

In addition, in the embodiment, the inside of the annular recessed portion 31 on the second member 12 side is filled with elastic adhesive 35 during assembling the first member 11 and the second member 12. Then, the emblem part 2 of the embodiment has a configuration in which the first member 11 and the second member 12 are joined based on an adhesive force of the elastic adhesive 35.

That is, in the emblem part 2 of the embodiment, the elastic adhesive 35 with which the inside of the annular recessed portion 31 is filled fixes the annular protrusion portion 33 inserted into the inside of the annular recessed portion 31 over the entire peripheries of the annular protrusion portion 33 and the annular recessed portion 31. Then, the emblem part 2 of the embodiment is configured to seal the housing space X further on the inner side than a joint portion 40 between the first member 11 and the second member 12 formed, as described above, in a liquid tight manner.

More specifically, as illustrated in FIG. 2, in the embodiment, the annular protrusion portion 33 on the first member 11 side and the side wall portion 24, and the outer wall portion 32 of the housing recessed portion 20 configuring the annular recessed portion 31 on the second member 12 side have a substantially elliptical ring shape in accordance with the elliptical shape of the design surface 2s. In addition, in the embodiment, the rear surface portion 11b of the first member 11 and the body portion 21 of the second member 12 are formed by using resin materials different from each other. Then, the elastic adhesive 35 of the embodiment has elasticity so as to allow relative displacement between the first member 11 and the second member 12 based on a difference in thermal expansion coefficient, even in a post-curing state of the elastic adhesive 35 to fix the annular protrusion portion 33 inserted into the inside of the annular recessed portion 31 as described above.

In addition, in the embodiment, as the elastic adhesive 35, modified silicon-based adhesive is used. Then, viscosity during coating is set to be a certain degree (for example, substantially 10 to 20 [Pa·s] and substantially that of honey) in which the adhesive evenly spreads over the entire periphery of the annular recessed portion 31 which is filled with the adhesive and jumping thereof does not occur.

In addition, as illustrated in FIG. 1, when assembling the emblem switch 1 of the embodiment, the rear surface portion 11b of the first member 11 and the inner cover member 22 of the second member 12 are fixed by using a double-sided adhesive tape 42. Thus, it is configured to perform positioning between the first member 11 and the second member 12, and to enhance the adhesive force.

Furthermore, as illustrated in FIGS. 2 and 3, in the emblem part 2 of the embodiment, a periphery wall portion 50 surrounding an outside of the joint portion 40 joined to the second member 12 is formed in the rear surface portion 11b of the first member 11. In the embodiment, the periphery wall portion 50 is formed in a substantially elliptical ring shape extending over the entire periphery of the first member 11 in the outermost edge of the rear surface portion 11b. Then, a leading end 50a of the periphery wall portion 50 extends in a direction (direction from an upper side to a lower side in FIGS. 1 and 3) opposite to the design surface than a leading end 32a of the outer wall portion 32 on the second member 12 side.

That is, the emblem part 2 of the embodiment forms a labyrinth structure in which the annular protrusion portion 33 and the periphery wall portion 50 on the first member 11 side, and the side wall portion 24 and the outer wall portion 32 of the housing recessed portion 20 configuring the annular recessed portion 31 on the second member 12 side are entangled with each other. Thus, it becomes a structure ensuring high waterproofness.

As described above, according to the embodiment, it is possible to obtain the following effects.

(1) the emblem part 2 as the exterior component for a vehicle includes the first member 11 that has the design surface 2s disposed on the vehicle surface S and the second member 12 that forms the housing space X sealed between the first member 11 and the second member 12 in a liquid tight manner by being joining to a portion of the first member 11 on the rear side. The second member 12 has the annular recessed portion 31 extending over the entire periphery of the second member 12. In addition, the first member 11 has the annular protrusion portion 33 extending over the entire periphery of the first member 11. Furthermore, the inside of the annular recessed portion 31 on the second member 12 side is filled with the elastic adhesive 35 during assembling the first member 11 and the second member 12. Then, the elastic adhesive 35 fixes the annular protrusion portion 33 inserted into the inside of the annular recessed portion 31 over the entire peripheries of the annular protrusion portion 33 and the annular recessed portion 31, and thereby the joint portion 40 between the first member 11 and the second member 12 is formed.

According to the configuration described above, the first member 11 and the second member 12 are evenly joined over the entire peripheries of the annular protrusion portion 33 and the annular recessed portion 31. In addition, the labyrinth structure, in which the annular recessed portion 31 and the annular protrusion portion 33 inserted into the inside of the annular recessed portion 31 are entangled with each other, is formed. Furthermore, the applied elastic adhesive 35 is held on the inside of the annular recessed portion 31 by the labyrinth structure. Thus, it is possible to secure high waterproofness. In addition, in a case of the related art, dimensions of an external shape are enlarged by increasing fastening portions so as to reduce squeeze unevenness of the O-ring. However, it is possible to avoid the occurrence of such a problem by employing the configuration described above. As a result, it is possible to secure the larger housing space X. Then, for example, it is also possible to apply the configuration to a smaller exterior component for a vehicle such as a button type switch disposed on the vehicle surface S.

(2) The joint portion 40 between the first member 11 and the second member 12 has a substantially elliptical ring shape. According to the configuration described above, it is possible to evenly apply the elastic adhesive 35 over the entire periphery of the annular recessed portion 31 configuring the joint portion 40. In addition, there is an advantage that stress concentration is unlikely to occur when compared to a case where the joint portion 40 is formed in a polygonal ring shape. Thus, it is possible to secure higher strength.

(3) The elastic adhesive 35 has elasticity capable of allowing the relative displacement based on the difference in thermal expansion coefficient between the first member 11 and the second member 12, even in the post-curing state to fix the annular protrusion portion 33 inserted into the inside of the annular recessed portion 31.

That is, if the first member 11 and the second member 12 configuring the emblem part 2 are formed by using different resin, the relative displacement between the both is likely to occur based on the difference in the thermal expansion coefficient. Thus, the relative displacement based on the difference in the thermal expansion coefficient is likely to occur also by, for example, a temperature difference between an inside and an outside of the vehicle surface S due to direct sunlight and the like in addition to a case where a material-specific thermal expansion coefficient is different. However, according to the configuration described above, the elastic adhesive 35 configuring the joint portion 40 between the first member 11 and the second member 12 is elastically deformed, and thereby it is possible to absorb the relative displacement between the first member 11 and the second member 12. In addition, even if an external force is applied to the emblem part 2, it is possible to absorb the external force. Thus, it is possible to secure high reliability by reducing a load of the first member 11 and the second member 12 configuring the emblem part 2.

(4) The periphery wall portion 50 surrounding the outside of the joint portion 40 between the first member 11 and the second member 12 is formed in the rear surface portion 11*b* of the first member 11.

According to the configuration described above, the joint portion 40 is unlikely to be wet by water. In addition, it is possible to form a further complicated labyrinth structure between the wall portions configuring the joint portion 40, that is, the annular protrusion portion 33 provided on the first member 11 side and the side wall portion 24 and the outer wall portion 32 of the housing recessed portion 20 configuring the annular recessed portion 31 provided on the second member 12 and the periphery wall portion 50. Thus, it is possible to secure higher waterproofness.

(5) The second member 12 includes the housing recessed portion 20 as a holding portion that holds the sensor electrode 3*a* and the circuit substrate 3*b* of the electrostatic capacitive sensor 3 as the housed body on the inner side than the joint portion 40 at which the second member 12 is joined to the first member 11 having an annular shape.

That is, the joint portion 40 has the structure to allow penetration of water to the outside of the elastic adhesive 35 applied to the inside of the annular recessed portion 31. However, according to the configuration described above, the sensor electrode 3*a* as the housed body does not overlap with the joint portion 40 when viewing the emblem switch 1 from the design surface 2*s* side of the emblem part 2 (see FIG. 2). Thus, it is possible to secure higher sensor sensitivity by avoiding electric and electromagnetic interference between the sensor electrode 3*a* and the joint portion 40.

(6) The second member 12 has the inner cover member 22 that closes the housing recessed portion 20 by being fixed to the opening end of the housing recessed portion 20. Then, in the emblem part 2, the inner cover member 22 of the second member 12 and the rear surface portion 11*b* of the first member 11 are fixed (adhered) by using the double-sided adhesive tape 42.

According to the configuration described above, the double-sided adhesive tape 42 functions as a second joint portion. Thus, it is possible to further firmly join the first member 11 and the second member 12. In addition, accordingly, position deviation between the first member 11 and the second member 12 is unlikely to occur before the elastic adhesive 35 is cured on the inside of the annular recessed portion 31 by performing positioning during assembling. As a result, it is possible to handle the emblem switch 1 in a temporary assembled state. Thus, it is possible to achieve improvement of working efficiency.

Moreover, the embodiment described above may be changed as below.

The embodiment described above is embodied in the emblem switch 1 in which the electrostatic capacitive sensor 3 as the housed body is housed on the inside of the emblem part 2 as the exterior component for a vehicle. However, it is not limited to the embodiment and if an exterior component is provided on the vehicle surface S, the embodiment disclosed here may be also applied to the exterior component having any shape, size, and the like. Furthermore, the housed body may be also changed arbitrarily to, for example, an electronic apparatus having a wireless communication antenna and the like. Furthermore, also in this case, it is preferable that a holding portion of the housed body is set further on the inner side than the joint portion 40 between the first member 11 and the second member 12 having the annular shapes. Thus, similar to the embodiment described above, even if water penetrates to the outside of the elastic adhesive 35 applied to the inside of the annular recessed portion 31, it is possible to avoid electric and electromagnetic interference between the housed body and the joint portion. Then, the housed body may be other than the electronic apparatus.

In the embodiment described above, the annular recessed portion 31 is provided on the second member 12 side and the annular protrusion portion 33 is provided on the first member 11 side. However, it is not limited to the embodiment. It may be configured to provide the annular recessed portion 31 on the first member 11 side, and to provide the annular protrusion portion 33 on the second member 12 side.

In the embodiment described above, the periphery wall portion 50 provided in the rear surface portion 11b of the first member 11 surrounds the outside of the joint portion 40 between the first member 11 and the second member 12 in the outermost edge of the rear surface portion 11b. However, it is not limited to the embodiment and it may be configured to provide a plurality of the periphery wall portions 50. Then, it may also be configured not to have the periphery wall portion 50.

Figure 4:
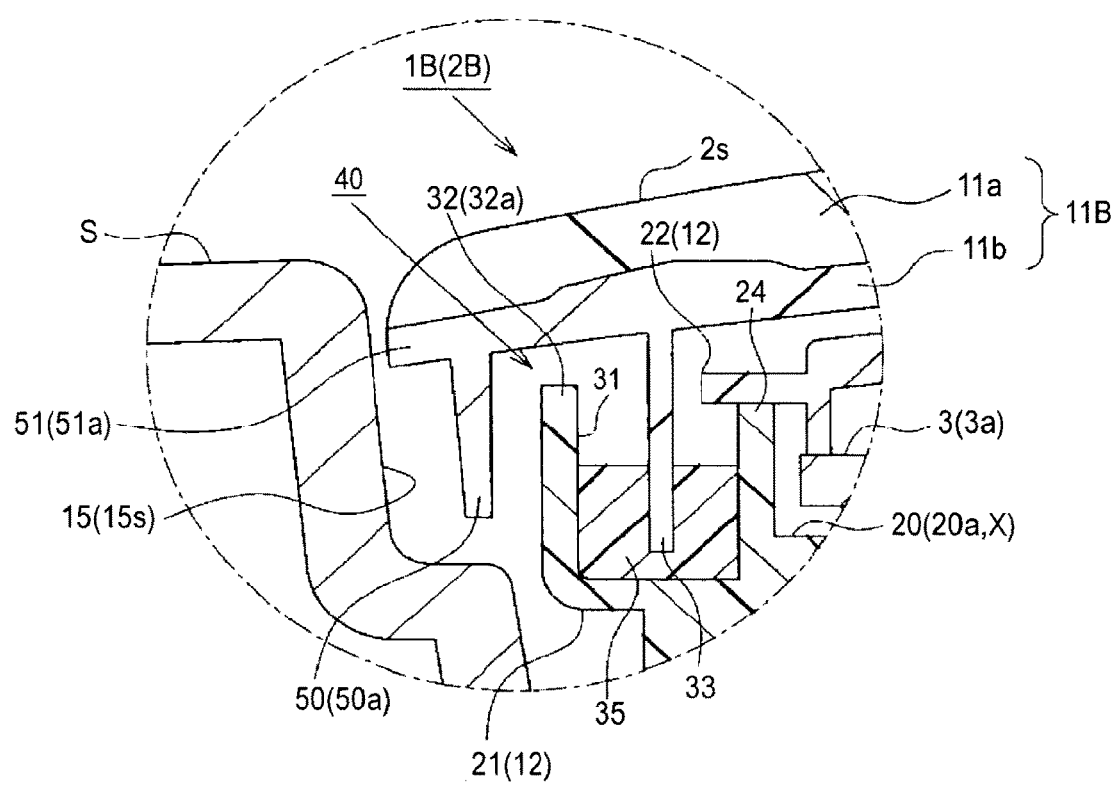
FIG. 4 is an enlarged sectional view of the vicinity of a joint portion between a first member and a second member illustrating a waterproof structure of another example.

In addition, as an emblem switch 1B (emblem part 2B) illustrated in FIG. 4, a first member 11B has a flange portion 51 that is continuous to the design surface 2s and extends further to the outside (left side in FIG. 4) than the periphery wall portion 50. Then, a leading end 51a of the flange portion 51 may be configured to face an inner wall surface 15s of the installation recessed portion 15. Water is unlikely to penetrate to the rear side of the design surface 2s by providing such a configuration. Thus, it is possible to secure higher waterproofness. In addition, similar to the periphery wall portion 50, it is preferable that the flange portion 51 is also extended over the entire periphery of the first member 11B. In addition, it is preferable that the flange portion 51 is configured such that the leading end 51a faces the inner wall surface 15s of the installation recessed portion 15 in a closer position. Then, in a case where a configuration that does not have the periphery wall portion 50 is employed, it may be configured to form the flange portion 51 extending further to the outer side than the joint portion 40 between the first member 11 and the second member 12.

In the embodiment described above, the annular protrusion portion 33 on the first member 11 side and the side wall portion 24, and the outer wall portion 32 of the housing recessed portion 20 configuring the annular recessed portion 31 on the second member 12 side have substantially elliptical ring shapes in accordance with the elliptical shape of the design surface 2s. However, it is not limited to the embodiment and, for example, the ring shape of the joint portion 40 may be changed arbitrarily such as the polygonal ring shape. However, if spreading when applying the elastic adhesive 35 to the inside of the annular recessed portion 31 and strength of the joint portion 40, are considered, it is preferable that it is the ring shape.

The resin material of the first member 11 and the second member 12 configuring the emblem part 2 may be selected arbitrarily. For example, the same resin material may be used. Then, also for composition of the elastic adhesive 35, it is not limited to modified silicon-based adhesive and it may be selected arbitrarily.

In the embodiment described above, the double-sided adhesive tape 42 interposed between the inner cover member 22 of the second member 12 and the rear surface portion 11b of the first member 11 functions as the second joint portion. However, it is not limited to the embodiment and, for example, a member configuring the second joint portion may be changed arbitrarily such as using adhesive capable of attaching or detaching the first member 11 and the second member 12 at least during curing, or employing a fit structure such as snap fit. In addition, a joint part between the first member 11 and the second member 12 by the second joint portion may also be changed arbitrarily. For example, the second joint portion may be configured to be set on the outer side than the joint portion 40 which forms the annular shape. Then, the configuration is not excluded in a configuration in which the second joint portion uses a fastening member.

However, as the embodiment described above, in a case of a configuration in which the electronic apparatus is housed on the inside of the housing space X, it is preferable that the housed body and the second joint portion are configured to have no electric and electromagnetic interference therebetween.

Next, technical idea which can be grasped from the embodiment described above will be described as advantages.

(A) The exterior component for a vehicle characterized in that the elastic adhesive has elasticity capable of allowing the relative displacement based on the difference in thermal expansion coefficient between the first member and the second member, even in the after curing state to fix the annular protrusion portion inserted into the inside of the annular recessed portion.

That is, if the first member and the second member are formed by using different resin, the relative displacement between the both is likely to occur based on the difference in the thermal expansion coefficient. Thus, the relative displacement based on the difference in the thermal expansion coefficient is likely to occur also by, for example, a temperature difference between the inside and the outside of the vehicle surface due to direct sunlight and the like in addition to a case where the material-specific thermal expansion coefficient is different. However, according to the configuration described above, the elastic adhesive configuring the joint portion between the first member and the second member is elastically deformed, and thereby it is possible to absorb the relative displacement between the first member and the second member. In addition, even if the external force is applied to the exterior component for a vehicle, it is possible to absorb the external force. Thus, it is possible to secure high reliability by reducing a load of the first member and the second member.

(B) The exterior component for a vehicle characterized in that the joint portion has the ring shape.

According to the configuration described above, it is possible to apply the elastic adhesive evenly over the entire periphery of the annular recessed portion configuring the joint portion. In addition, there is an advantage that stress concentration is unlikely to occur when compared to a case where the joint portion is formed in a polygonal ring shape. Thus, it is possible to secure higher strength.

(C) The exterior component for a vehicle characterized in that the second joint portion is configured of the double-sided adhesive tape. Thus, it is possible to form the second joint portion having a simple configuration and that is easy to handle.

An aspect of this disclosure is directed to an exterior component for a vehicle preferably including a first member that has a design surface disposed on a vehicle surface; and a second member that forms a housing space which is sealed between the first member and the second member in a liquid tight manner by being joined to the first member on a rear side of the design surface, in which a joint portion between the first member and the second member is configured of an annular recessed portion that is provided on one side of the first member and the second member, an annular protrusion portion that is provided on the other side of the first member and the second member, and elastic adhesive with which an inside of the annular recessed portion is filled thereby fixing the annular protrusion portion inserted into the inside of the annular recessed portion over the entire peripheries of the annular protrusion portion and the annular recessed portion.

According to the configuration described above, the first member and the second member are evenly joined over the entire peripheries of the annular protrusion portion and the annular recessed portion. In addition, a labyrinth structure, in which the annular recessed portion and the annular protrusion portion inserted into the inside of the annular recessed portion are entangled with each other, is formed. Furthermore, the applied elastic adhesive is held on the inside of the annular recessed portion by the labyrinth structure. Thus, it is possible to secure high waterproofness. In addition, in a case of the related art, dimensions of an external shape are enlarged by increasing fastening portions so as to reduce squeeze unevenness of an O-ring. However, it is possible to avoid the occurrence of such a problem by employing the configuration described above. As a result, it is possible to secure a larger housing space or to achieve reduction of an external size.

In the exterior component for a vehicle described above, it is preferable that the first member includes a peripheral wall portion surrounding an outside of the joint portion on the rear side of the design surface.

According to the configuration described above, the joint portion is unlikely to be wet by water. In addition, it is possible to form a further complicated labyrinth structure between wall portions of the annular protrusion portion and the annular recessed portion configuring the joint portion and the peripheral wall portion. Thus, it is possible to secure higher waterproofness.

In the exterior component for a vehicle described above, it is preferable that the second member is disposed on an inside of an installation recessed portion formed on the vehicle surface, and the first member has a flange portion whose leading end faces an inner wall surface of the installation recessed portion by being continuous to the design surface and extending further to an outer side than the joint portion.

According to the configuration described above, water is unlikely to penetrate to the rear side of the design surface. Thus, it is possible to secure higher waterproofness.

It is preferable that the exterior component for a vehicle described above further includes a holding portion of a housed body further on an inner side than the joint portion.

That is, the joint portion between the first member and the second member, which is formed of the annular recessed portion, the annular protrusion portion, and the elastic adhesive, has the structure to allow penetration of water to the outside of the elastic adhesive applied to the inside of the annular recessed portion. However, according to the configuration described above, the housed body held on the inside of the housing space does not overlap with the joint portion when viewed from the design surface side. Thus, it is possible to avoid electric and electromagnetic interference between the joint portion and the housed body, even if water penetrates to the outside of the elastic adhesive. As a result, it is possible to secure higher sensitivity, even in a case of a configuration in which a sensor electrode, an antenna, and the like as the housed body are held on the inside of the housing space.

In the exterior component for a vehicle described above, it is preferable that the elastic adhesive has elasticity capable of allowing relative displacement based on a difference in thermal expansion coefficient between the first member and the second member, even in a post-curing state to fix the annular protrusion portion inserted into the inside of the annular recessed portion.

In the exterior component for a vehicle described above, it is preferable that the joint portion has a ring shape.

It is preferable that the exterior component for a vehicle described above further includes a second joint portion joining the first member and the second member.

According to the configuration described above, it is possible to further firmly join the first member and the second member. In addition, accordingly, position deviation between the first member and the second member is unlikely to occur before the elastic adhesive is cured on the inside of the annular recessed portion by performing positioning during assembling. As a result, it is possible to handle the exterior component for a vehicle in a temporary assembled state. Thus, it is possible to achieve improvement of working efficiency.

In the exterior component for a vehicle described above, it is preferable that the second joint portion joins the first member and the second member within the housing space on an inner side than the annular recessed portion.

According to the configuration described above, it is possible to join the first member and the second member more reliably and in a well-balanced manner while avoiding electric and electromagnetic interference between the second joint portion and the housed body.

In the exterior component for a vehicle described above, it is preferable that the second joint portion is a double-sided adhesive tape.

According to the aspect of this disclosure, it is possible to secure higher waterproofness.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. An exterior component for a vehicle comprising:
   a first member that has a design surface disposed on a vehicle surface; and
   a second member that forms a housing space which is sealed between the first member and the second member in a liquid tight manner by being joined to the first member on a rear side of the design surface,
   wherein a joint portion between the first member and the second member is configured of
      an annular recessed portion that is provided on one side of the first member and the second member,
      an annular protrusion portion that is provided on the other side of the first member and the second member, and
      elastic adhesive with which an inside of the annular recessed portion is filled thereby fixing the annular protrusion portion inserted into the inside of the annular recessed portion over the entire peripheries of the annular protrusion portion and the annular recessed portion.

2. The exterior component for a vehicle according to claim 1, wherein the first member includes a peripheral wall portion surrounding an outside of the joint portion on the rear side of the design surface.

3. The exterior component for a vehicle according to claim 1,
wherein the second member is disposed on an inside of an installation recessed portion formed on the vehicle surface, and
wherein the first member has a flange portion whose leading end faces an inner wall surface of the installation recessed portion by being continuous to the design surface and extending further to an outer side than the joint portion.

4. The exterior component for a vehicle according to claim 1, further comprising:
a holding portion of a housed body further on an inner side than the joint portion.

5. The exterior component for a vehicle according to claim 1,
wherein the elastic adhesive has elasticity capable of allowing relative displacement based on a difference in thermal expansion coefficient between the first member and the second member, even in a post-curing state to fix the annular protrusion portion inserted into the inside of the annular recessed portion.

6. The exterior component for a vehicle according to claim 1,
wherein the joint portion has a ring shape.

7. The exterior component for a vehicle according to claim 1, further comprising
a second joint portion joining the first member and the second member.

8. The exterior component for a vehicle according to claim 7,
wherein the second joint portion joins the first member and the second member within the housing space on an inner side than the annular recessed portion.

9. The exterior component for a vehicle according to claim 7,
wherein the second joint portion is a double-sided adhesive tape.

* * * * *